2,789,966

INTERPOLYCARBONATES FROM 4,4'-BIS(HYDROXYMETHYL) - BIPHENYL - BIS(ALKYL OR ARYL CARBONATES)

Delbert D. Reynolds and Kenneth R. Dunham, Rochester, N. Y., assignors to Eastman Kodak Company, Rochester, N. Y., a corporation of New Jersey No Drawing. Application February 2, 1954,
Serial No. 407,805

18 Claims. (Cl. 260—47)

This invention relates to highly polymeric linear interpolycarbonates prepared by the co-condensation in the presence of certain ester-interchange catalysts of a 4,4'-bis($\beta$-hydroxymethyl) - biphenyl - bis - (alkyl or aryl carbonate) mixed together with another copolymerizable bis-(carbonate) monomer as described below. These starting materials are hereinafter collectively referred to as bis-(carbonate) monomers and are separately respectively referred to as either primary or as copolymerizable bis-(carbonate) monomers. This invention also includes interpolycarbonates prepared when employing mixtures of several of these primary bis-(carbonate) monomers and/or employing mixtures of the copolymerizable bis-(carbonate) monomers. Furthermore, this invention relates to the processes involved in preparing the polymers.

It is an object of this invention to provide unusually superior highly polymeric linear interpolycarbonates which are valuable in preparing fibers, film, etc. as described herein. An additional object of this invention resides in providing a process for converting the mixed starting materials into the interpolycarbonates. Other objects will become apparent hereinafter.

Linear polycarbonates prepared by the self-condensation of a 4,4' - bis($\beta$ - hydroxymethyl) - biphenyl - bis-(alkyl or aryl carbonate) or mixtures thereof have been described in our co-pending application filed on December 8, 1953, Serial No. 397,036. The products of the previously filed application are highly polymeric polycarbonates which possess high intrinsic viscosity and high melting points such that they can be extruded to form films, fibers, and the like which can be mechanically worked and heat-set to form molecularly oriented structures. However, these polycarbonates are characterized by their rapid rate of crystallization. As a result they cannot be readily quenched by ordinary means with sufficient speed to halt their inherently rapid rate of crystallization.

In order for a linear polymer to be readily fabricated into a film which can be oriented axially or in the plane of the film (the same applies to a fiber as regards its longitudinal axis), it is necessary that the rate of crystallization of the extruded material be such that the material can be extruded and quenched to yield an amorphous film (or fiber). Such amorphous products can then be mechanically and thermally treated to yield molecularly oriented products. The quenching should ordinarily be capable of being accomplished in air, or in a liquid such as water or an organic liquid which is not a solvent for the polymer. If the polymeric material is not properly quenched to form an amorphous material, then the polymeric material acquires a crystalline brittle character which cannot be satisfactorily worked mechanically due to the tendency toward breaking.

We have now found that certain interpolycarbonates can be prepared which posses a rate of crystallization such that an extruded film or fiber can be readily quenched by ordinary commercial means to create a substantially amorphous molecular structure within the material. For example, an extruded film having a thickness on the order of about 0.05 inch can be prepared from the interpolyesters of this invention which can be quenched in water to create a substantially amorphous product.

The novel interpolycarbonates of this invention can be prepared by a process which comprises (A) co-condensing a mixture consisting of at least 5 mole percent of a primary bis-(carbonate) monomer having the following formula:

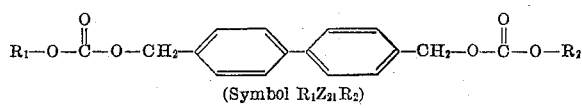

(Symbol R₁Z₂₁R₂)

wherein $R_1$ and $R_2$ each represents a radical selected from the group consisting of lower alkyl radicals containing from 1 to 4 carbon atoms and aryl radicals of the benzene series containing from 6 to 8 carbon atoms, together with at least 5 mole percent of a copolymerizable bis-(carbonate) monomer having one of the following formulas and which is employed in no greater proportion than the mole percentage indicated:

| Chemical Formula | Max., Percent | Symbol |
|---|---|---|
| $R_1O-CO-O-R_3-O-CO-OR_2$ | 50 | None. |
| $R_1O-CO-O-(CH_2)_2-O-\langle\phantom{xx}\rangle-O-(CH_2)_2-O-CO-OR_2$ | 50 | $R_1Z_{101}R_2$. |
| $R_1O-CO-O-CH_2-\langle\phantom{xx}\rangle-CH_2-O-CO-OR_2$ | 95 | $R_1Z_{11}R_2$. |
| $R_1O-CO-O-(CH_2)_2-\langle\phantom{xx}\rangle-\langle\phantom{xx}\rangle-(CH_2)_2-O-CO-OR_2$ | 95 | $R_1Z_{22}R_2$. |
| $R_1O-CO-O-(CH_2)_2-O-\langle\phantom{xx}\rangle-\langle\phantom{xx}\rangle-O-(CH_2)_2-O-CO-OR_2$ | 95 | $R_1Z_{202}R_2$. | wherein $R_1$ and $R_2$ each represents a radical selected from the group consisting of lower alkyl radicals containing from 1 to 4 carbon atoms and aryl radicals of the benzene series containing from 6 to 8 carbon atoms and $R_3$ represents an alkylene radical containing from 4 to 10 carbon atoms, (B) in the presence of an ester-interchange catalyst containing titanium as the metallic element, which catalyst can be selected from the group consisting of Ti(OR')₄TiX₄, and ether complexes of TiX₄ wherein the ether complexes are derived by reacting TiX₄ with an ether selected from the group consisting of aliphatic and alicyclic ethers containing from 2 to 12 carbon atoms, and wherein R' represents an alkyl radical containing from 1 to 18 carbon atoms and X represents a halogen atom, (C) at an elevated temperature, (D) the condensation being conducted in an inert atmosphere and (E) the latter part of the condensation being conducted at a very low pressure.

The symbols presented above are set forth in order to provide a convenient way in which to refer to the various copolymerizable bis-(carbonate) monomers without having to set forth the entire formula or chemical name on each occasion. No symbols are used for the aliphatic bis-(carbonates) since the names of these compounds are not especially complex. The symbol $Z_{11}$ represents a symmetrical bis-(carbonate) as indicated above wherein there is one (the first number in the subscript) benzene ring which is directly connected at the 1 and 4 positions to one (the second number in the subscript) methylene radical. The symbol $Z_{202}$ has a similar connotation wherein there are 2 benzene rings connected at the 4 and 4' positions through an O atom to two methylene radicals, i. e. an ethylene radical. The other symbols have analogous connotations.

The $R_1$ and $R_2$ portions of these symbols further represent the nature of the ester. Thus, 1,4-bis-($\beta$-hydroxyethyl)-benzene-bis (n-propylcarbonate) has the symbol n-$C_3H_7Z_{12}$. The significance of $R_1$ is not repeated twice if $R_2$ is the same as $R_1$ as is usually the case.

It can readily be seen from the description of the process that there is no problem involved in adjusting the ratio of carbonate constituent to dihydroxy (glycol) constituent in the reaction vessel since the polycarbonates are produced according to this invention by the co-condensation of only one type of starting material. This establishes the composition of the polycarbonate produced since there can be no variation in the proportion of carbonate and glycol constituents. Moreover, the nature of this process makes it admirably suited to conducting the process on a continuous basis since no problems are involved in maintaining critical proportions of reactants.

Examples of the primary class of starting materials, i. e. the primary bis-(carbonate) monomers which can be used in the process of this invention include 4,4'-bis-(hydroxymethyl)-biphenyl-bis-(ethyl carbonate), $C_2H_5Z_{21}$; 4,4'-bis-(hydroxymethyl)-biphenyl - bis - (p - tolyl carbonate), p-$CH_3C_6H_4Z_{21}$; 4,4'-bis-(hydroxymethyl)-biphenyl-bis-(phenyl carbonate), $C_6H_5Z_{21}$; 4,4' - bis - (hydroxymethyl)-biphenyl-bis-(n-butyl carbonate), n-$C_4H_9Z_{21}$; 4,4'-bis-(hydroxymethyl)-biphenyl-bis - (isopropyl carbonate), i-$C_3H_5Z_{21}$; 4,4'-bis-(hydroxymethyl)-biphenyl-bis-(methyl carbonate), $CH_3Z_{21}$; et cetera.

Examples of the copolymerizable bis-(carbonate) monomers which can be used in the process of this invention include:

In carrying out the process of this invention, the ester-interchange catalysts which can be employed as condensing agents are extremely limited as indicated. It would perhaps appear that any of the well-recognized ester-interchange catalysts would be operative. However, this has not been found to be the case. Very unexpectedly, the applicants discovered that only certain compounds of titanium can be satisfactorily employed as catalysts to produce the polyesters of this invention. Other compounds, even including some compounds of titanium, which are well-recognized ester-interchange catalysts promote the degradation of the starting material with the formation of ethylenic unsaturation and cross-linking. This aspect of the invention is discussed in greater detail hereinbelow.

The titanium catalysts described above can be advantageously employed in an amount of from about 0.005% to about 0.5% by weight based on the weight of the bis-(carbonate) monomer being condensed. Higher or lower percentages can also be employed.

The temperature at which the condensation is conducted depends upon whether the process is conducted in the solid phase or in the liquid phase. When either type of process is used, the temperature can be advantageously increased during the course of the condensation. Advantageously, the reaction can be considered as being conducted in two stages. The temperature to which the condensation reaction mixture is initially raised at the beginning of Stage I is advantageously in excess of 200° C. Lower temperatures can also be employed although it is generally advantageous to use an initial temperature of at least about 200° C. Although it is convenient to consider the condensation process as being conducted in two separate stages, the actual condensation itself continues smoothly from Stage I into Stage II. The principal distinction between the so-called two stages lies in the fact that during Stage II, the pressure of the adjacent atmosphere under which the condensation is performed is greatly reduced. Although the temperature can remain the same for both the first and the second stage, it is advantageous to employ a somewhat higher temperature at about the same time the pressure is reduced, especially when the liquid phase process is being employed. The temperatures used during the latter part of Stage II can advantageously be at least 250° C. or higher; the maximum temperature which can be employed is determined by the tendency of the inter-poly-

| Chemical Formula | Symbol |
| --- | --- |
| $C_2H_5O-CO-O-(CH_2)_7-O-CO-OC_2H_5$ | None. |
| $C_2H_5O-CO-O-CH_2-\langle\rangle-CH_2-O-CO-OC_2H_5$ | $C_2H_5Z_{11}$ or $EtZ_{11}$. |
| $CH_3-\langle\rangle-O-CO-O-CH_2-\langle\rangle-CH_2-O-CO-O-\langle\rangle-CH_3$ | p-$CH_3C_6H_4Z_{11}$ or $TyZ_{11}$. |
| $C_3H_7O-CO-O-CH_2-\langle\rangle-CH_2-O-CO-OC_3H_7$ | $C_3H_7Z_{11}$. |
| $C_4H_9O-CO-O-(CH_2)_2-\langle\rangle-\langle\rangle-(CH_2)_2-O-CO-OC_4H_9$ | $C_4H_9Z_{22}$ or $BuZ_{22}$. |
| $CH_3O-CO-O-(CH_2)_2-O-\langle\rangle-O-(CH_2)_2-O-CO-OCH_3$ | $CH_3Z_{102}$. |
| $C_2H_5O-CO-O-(CH_2)_2-O-\langle\rangle-O-(CH_2)_2-O-CO-OC_2H_5$ | $C_2H_5Z_{102}$. |
| $CH_3O-CO-O-(CH_2)_2-O-\langle\rangle-\langle\rangle-O-(CH_2)_2-O-CO-OCH_3$ | $CH_3Z_{202}$ or $MeZ_{202}$. | et cetera.

carbonate to decompose at extremely high temperatures. As a practical matter, it is most advantageous to employ a maximum temperature of not much more than about 250° C. When a solid phase process is employed, the maximum temperature can be restricted to much lower temperatures, although the time required to accomplish the production of desirable linear polymeric polycarbonates may be increased accordingly.

The reduced pressure which is employed during Stage II of the condensation is advantageously less than about 15 mm. of Hg pressure or less. Generally speaking, pressures are employed which are the lowest pressures obtainable by the employment of an efficient high-vacuum mechanical pump. Such pressures are generally in the range of less than 1 mm. of Hg pressure.

The time required for each of the two stages can advantageously be from about 15–20 minutes to several hours. Longer or shorter periods of time can also be employed.

The inert atmospheres which can be advantageously employed in the course of the condensation reaction include atmospheres of nitrogen, hydrogen, helium, carbon dioxide, etc.

It is generally advantageous to stir the condensation reaction mixture in order to maintain a reasonably even distribution of heat throughout the reaction mixture and to otherwise facilitate the condensation. However, this is not essential especially when small quantities of mixed bis-(carbonate) monomers are being condensed. During the course of the reaction, an alkyl ester and/or an aryl ester of carbonic acid will be evolved as a gas, as indicated hereinabove. Stirring facilitates the removal of such an ester in its gaseous form. Either as an aid to the stirring operation or in lieu thereof, the inert gas can be advantageously bubbled through the reaction mixture whereby the removal of the carbonic acid ester is also facilitated.

The various conditions described somewhat generally hereinabove in regard to the process of this invention can obviously be altered to suit the particular starting material being condensed and other conditions which are specific to the reaction being accomplished depending upon the particular set of circumstances. These variations are set forth to some extent in the examples below.

The products of this invention are linear highly polymeric crystalline interpolycarbonates having melting points above about 100° C., high intrinsic viscosities, and always containing at least 5 mole percent of the following repeating units:

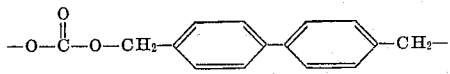

wherein the units are connected by ester linkages either to an identical unit or to a copolymerizable unit having one of the following formulas:

wherein $R_3$ represents an alkylene radical containing from 4 to 10 carbon atoms, and the maximum mole percent is specified for the proportion of the copolymerizable unit in the interpolycarbonate.

In this specification all intrinsic viscosities are measured by standard procedures employing solutions in 60% phenol-40% sym. tetrachloroethane.

The interpolycarbonates of this invention can be prepared by various continuous processes employing many types of apparatus known to be useful in conducting various related continuous processes as described in the prior art, for example, the method described in U. S. 2,647,885 can be suitably adapted. For another example reference is made to application, Serial No. 397,040, filed on December 8, 1953.

The primary bis-(carbonate) monomers employed in accordance with this invention can be prepared by condensing an alkyl or an aryl chlorocarbonate with 1,4-bis-(hydroxymethyl)-biphenyl in the presence of pyridine. Although it is advantageous to carry out this condensation in a tertiary amine such as pyridine, other acid-binding agents can also be employed. This process is described in our copending application, Serial No. 397,036, filed on December 8, 1953. The preparation of the copolymerizable bis-(carbonate) monomers is analogous to this process and is described in other related applications filed on December 8, 1953.

The primary bis-(carbonate) monomer and various copolymerizable bis-(carbonate) monomers yield interpolycarbonates having an unstable structure in the presence of most ester-interchange catalysts whereby they decompose forming various undesirable products. This situation demonstrates the unusual advantages of employing the titanium catalysts covered by the applicants' invention. Several of the following examples illustrate the employment of titanium butoxide as the catalyst.

Titanium butoxide and many of its homologs are thick liquids. One drop weighs about 0.015 gram and contains about 0.0002 equivalents of titanium. It is sometimes advantageous to dissolve this compound or some of the other titanium compounds in an alcohol to facilitate handling the catalyst.

Another titanium compound which has been found to be useful is titanium tetrachloride. Titanium tetrachloride is difficult to handle because of its rapid reaction with the moisture in the air. It has, therefore, been found advantageous to employ this compound in the form of an ether complex. In preparing these complexes, the lower aliphatic ethers containing from 2 to 8 carbon atoms on either side of the central oxygen atom and the cyclic ethers such as 1,4 dioxane can be employed. The ether complexes are prepared advantageously by adding titanium tetrachloride slowly to an excess of the ether. It is advantageous to maintain the ether at ambient temperatures

|  | Max., Percent |
|---|---|
| $-\text{O}-\overset{\text{O}}{\underset{\|}{\text{C}}}-\text{O}-\text{R}_3-$ | 50 |
| $-\text{O}-\overset{\text{O}}{\underset{\|}{\text{C}}}-\text{O}-(\text{CH}_2)_2-\text{O}-\!\!\left\langle\!\!\bigcirc\!\!\right\rangle\!\!-\text{O}-(\text{CH}_2)_2-$ | 50 |
| $-\text{O}-\overset{\text{O}}{\underset{\|}{\text{C}}}-\text{O}-\text{CH}_2-\!\!\left\langle\!\!\bigcirc\!\!\right\rangle\!\!-\text{CH}_2-$ | 95 |
| $-\text{O}-\overset{\text{O}}{\underset{\|}{\text{C}}}-\text{O}-(\text{CH}_2)_2-\!\!\left\langle\!\!\bigcirc\!\!\right\rangle\!\!-\!\!\left\langle\!\!\bigcirc\!\!\right\rangle\!\!-(\text{CH}_2)_2-$ | 95 |
| $-\text{O}-\overset{\text{O}}{\underset{\|}{\text{C}}}-\text{O}-(\text{CH}_2)_2-\text{O}-\!\!\left\langle\!\!\bigcirc\!\!\right\rangle\!\!-\!\!\left\langle\!\!\bigcirc\!\!\right\rangle\!\!-\text{O}-(\text{CH}_2)_2-$ | 95 |

(20°–30° C.) or lower during this addition. Examples regarding the preparation of these ether complexes are presented in our copending application, Serial No. 397,037, filed on December 8, 1953.

It is believed that the examples set forth in our copending application, Serial No. 397,037, make it quite clearly apparent that the specified titanium catalysts are desirable in the preparation of linear highly polymeric crystalline polycarbonates when self-condensing the primary bis-(carbonate) monomers; the same can obviously be said of the mixed bis-(carbonate) monomers of this invention. Other catalysts such as the alkali metal and the alkaline earth metal alkoxides are either inoperative or are strikingly inferior to these titanium compounds.

The interpolycarbonates of our invention can be further illustrated by the working examples which are set forth below in tabular style. The first column sets forth the example number. The second and third columns set forth the weight in grams of each of the two bis-(carbonate) monomers which are interpolymerized. In each of those columns the symbol of the monomer is employed; these symbols are readily associated with the formal names of the compounds being designated. When $R_1$ and $R_2$ are both ethyl radicals the symbols are shortened by using the abbreviation Et which symbolizes the presence of the two ethyl radicals; the abbreviation Me symbolizes two methyl radicals; Pr symbolizes two normal propyl radicals; Bu symbolizes two normal butyl radicals; Ph symbolizes two phenyl radicals; Ty symbolizes two p-tolyl radicals, etc. The next column sets forth the mole ratio as calculated from the proportions of the primary monomer and the copolymerizable monomer which are employed. The next column sets forth the amount of the catalyst employed. In most instances the catalyst is titanium butoxide which is measured in drops (abbreviated dp.) or in grams (g.). The catalyst employed is generally a titanium alkoxide which is designated merely by an abbreviation of the alkoxide employed, thus titanium butoxide is designated as "Butox"; similarly, titanium tetrachloride is designated as "chloride"; likewise, the ether complexes of the titanium tetrahalides are similarly abbreviated, thus the ethyl ether complex of titanium tetrachloride is abbreviated as "Et-complex" and the 1,4-dioxane complex of titanium tetrachloride is abbreviated as "dioxane-complex."

The next few columns in the tabulation of the examples show the number of minutes during which the specified temperature is maintained for each of the two stages of the condensation reaction. The last two columns of the tabulation show the intrinsic viscosity and the melting point of the interpolycarbonates obtained.

In each working example the primary bis-(carbonate) monomer and the copolymerizable bis-(carbonate) monomer were mixed together and the specified catalyst was added. The reactants were heated and nitrogen was bubbled through the melt during Stage I. The alkyl or aryl carbonate which formed during the course of Stage I was allowed to escape or was collected by means of a condenser in those working examples where large quantities of the reactants were involved. Stage I was considered as reaching an end when the condensation had proceeded to a point where further heating under vacuum would not be capable of removing an appreciable amount of either of the bis-(carbonate) monomers being condensed. Stage II was then begun by attaching a vacuum pump to the reaction vessel and closing off the inlet for the inert gas. The reduced pressure employed was from 0.1 to 1 mm. of Hg pressure. This reduced pressure was maintained for the remainder of Stage II. During Stage II the alkyl or aryl carbonate which formed was condensed in at least one Dry Ice-acetone trap which was placed between the reaction vessel and the vacuum pump.

With the above explanation it is apparent that the following examples are clearly understandable to anyone familiar with the art to which this invention pertains.

| Example No. | Grams and Symbol of Primary Monomer | Grams and Symbol of Copolymer Monomer | Mol Ratio | Amount and Symbol for Catalyst | Minutes for— | | Temp. (°C.) for— | | Intrinsic Viscosity | Melting Point, °C. |
|---|---|---|---|---|---|---|---|---|---|---|
| | | | | | I Stage | II Stage | I Stage | II Stage | | |
| 1 | 8.1 EtZ$_{21}$ | 0.65 of 1,6-hexanediol-bis (ethyl carbonate) | 90:10 | 3 dp. Butox | 20' | 30' | 275° | 275° | $^1$ Low | 245° |

This product crystallized rapidly to form a white polymer. Fibers drawn from the melt quenched satisfactorily in air, were readily cold drawn and heat set to form valuable fibers.

| | | | | | | | | | | |
|---|---|---|---|---|---|---|---|---|---|---|
| 2 | 72. EtZ$_{21}$ | 1.3 of 1,6-hexanediol-bis (ethyl carbonate). | 80:20 | 3 dp. Butox | 20' | 30' | 275° | 275° | 0.21 | 227° |

This product was similar to that described in Example 1.

| | | | | | | | | | | |
|---|---|---|---|---|---|---|---|---|---|---|
| 3 | 720 EtZ$_{21}$ | 130 of 1,6-hexanediol-bis (ethyl carbonate). | 80:20 | 2 g. Butox | 45' | 80' | 245° | 265° | 0.61 | 230° |

See footnotes at end of tables.

In this example the reaction was conducted with continuous stirring. The product was essentially the same as in the preceding example except for a higher intrinsic viscosity. This melt was extruded as a film of 0.05 inch thickness which satisfactorily quenched in water to form an amorphous product. This film was then drawn in perpendicular directions along the plane of its surface so as to form an oriented structure which was heat set to produce a film or sheet having excellent properties suitable for use as a wrapping material, photographic film, etc. Useful fibers were similarly prepared.

| Example No. | Grams and Symobl of Primary Monomer | Grams and Symbol of Copolymer Monomer | Mol Ratio | Amount and Symbol for Catalyst | Minutes for— | | Temp. (°C.) for— | | Intrinsic Viscosity | Melting Point, °C. |
|---|---|---|---|---|---|---|---|---|---|---|
| | | | | | I Stage | II Stage | I Stage | II Stage | | |
| 4 | 6.3 $EtZ_{21}$ | 2.0 of 1,6-hexanediol-bis (ethyl carbonate) | 70:30 | 3 dp. Butox | 20' | 30' | 275° | 275° | [1] Low | 230° |

This product was similar to that described in Examples 1, 2 and 3.

| 5 | 4.5 $EtZ_{21}$ | 3.2 of 1,6-hexanediol-bis (ethyl carbonate). | 50:50 | 3 dp. Butox | 20' | 30' | 275° | 275° | 0.23 | 185° |

This product was similar to that described in the preceding examples except that it crystallized more slowly. Films and fibers produced were quite flexible. Other interpolymers containing smaller proportions of $EtZ_{21}$ had unsatisfactorily low melting points.

| 6 | 8.1 $EtZ_{21}$ | 0.85 $EtZ_{102}$ | 90:10 | 3 dp. Butox | 20' | 30' | 275° | 275° | [1] Low | 249° |

This product crystallized fairly rapidly to form a white polymer. Fibers were formed from the melt which were quenched satisfactorily, were cold drawn and heat set.

| 7 | 8.1 $MeZ_{21}$ | 0.85 $MeZ_{102}$ | 90:10 | 3 dp. Ethox | 25' | 45' | 250° | 270° | 0.62 | 250° |

This product was similar to that described in Example 6.

| 8 | 7.2 $EtZ_{21}$ | 1.7 $EtZ_{102}$ | 80:20 | 3 dp. Butox | 20' | 30' | 275° | 275° | 0.27 | 240° |

This product was similar to that described in Examples 6 and 7.

| 9 | 720 $EtZ_{21}$ | 170 $EtZ_{102}$ | 80:20 | 2 g. Butox | 45' | 80' | 245° | 260° | 0.7 | 240° |

In this example the reaction was conducted with continuous stirring. The product was essentially the same as in the preceding example except for a higher intrinsic viscosity. This melt was extruded as a film of 0.05 inch thickness which satisfactorily quenched in water to form an amorphous product. This film was then drawn in perpendicular directions along the plane of its surface so as to form an oriented structure which was heat set to produce a film or sheet having excellent properties suitable for use as a wrapping material, photographic film, etc. Useful fibers were similarly prepared.

| 10 | 6.3 $EtZ_{21}$ | 2.6 $EtZ_{102}$ | 70:30 | 3 dp. Butox | 20' | 30' | 275° | 275° | 0.20 | 220° |

This product was similar to that described in the preceding examples 6–9; the film produced was quite tough.

| 11 | 6.3 $EtZ_{21}$ | 2.6 $EtZ_{102}$ | 70:30 | 0.05 g. of the chloride. | 25' | 45' | 260° | 270° | 0.45 | 220° |

This product was similar to that described in Example 10.

| 12 | 4.5 $EtZ_{21}$ | 4.3 $EtZ_{102}$ | 50:50 | 3 dp. Butox | 20' | 30' | 275° | 275° | [1] Low | 165° |

See footnotes at end of tables.

This product was similar to that described in Example 10 except that it was somewhat more difficult to cold draw. When higher proportions of EtZ$_{21}$ were employed the melting points were unsatisfactorily low and the polymers cold drew rather poorly.

| Example No. | Grams and Symbol of Primary Monomer | Grams and Symbol of Copolymer Monomer | Mol Ratio | Amount and Symbol for Catalyst | Minutes for— | | Temp. (°C.) for— | | Intrinsic Viscosity | Melting Point, °C. |
|---|---|---|---|---|---|---|---|---|---|---|
| | | | | | I Stage | II Stage | I Stage | II Stage | | |
| 13 | 8.1 EtZ$_{21}$ | 0.7 EtZ$_{11}$ | 90:10 | 3 dp. Butox | 20′ | 30′ | 275° | 275° | ¹ Low | 240° |

This product was a hard white crystalline polymer. Fibers were drawn from the melt which crystallized satisfactorily in air, were cold drawn and heat set to form useful fibers for making yarn, fabric, rope, etc.

| 14 | 7.2 EtZ$_{21}$ | 1.4 EtZ$_{11}$ | 80:20 | 3 dp. Butox | 20′ | 30′ | 275° | 275° | ¹ Low | 232° |

This product crystallized less rapidly and quenched more readily than the otherwise similar product described in Example 13.

| 15 | 720 EtZ$_{21}$ | 140 EtZ$_{11}$ | 80:20 | 2 g. Butox | 40′ | 75′ | 250° | 260° | 0.64 | 234° |

In this example the reaction was conducted with continuous stirring. The product was essentially the same as in the preceding example except for a higher intrinsic viscosity. The melt was extruded as a film of 0.05 inch thickness which satisfactorily quenched in water to form an amorphous product. This film was then drawn in perpendicular directions along the plane of its surface so as to form an oriented structure which was heat set to produce a film or sheet having excellent properties suitable for use as a wrapping material, photographic film, etc. Useful fibers were similarly prepared.

| 16 | 6.3 EtZ$_{21}$ | 2.1 EtZ$_{11}$ | 70:30 | 3 dp. Butox | 20′ | 30′ | 275° | 275° | ¹ Low | 205° |

This product was similar to that described in Example 14 except for a slower rate of crystallization.

| 17 | 4.5 EtZ$_{21}$ | 3.5 EtZ$_{11}$ | 50:50 | 3 dp. Butox | 20′ | 30′ | 275° | 275° | ¹ Low | 132° |

This product was somewhat similar to that described in Example 16 except that it was quite difficult to crystallize satisfactorily; however, this can be rectified by modification of the polymerization condition and quenching procedure.

| 18 | 1.8 EtZ$_{21}$ | 5.6 EtZ$_{11}$ | 20:80 | 3 dp. Butox | 20′ | 30′ | 275° | 275° | ¹ Low | 177° |

This product was somewhat similar to that described in Example 16.

| 19 | 0.9 EtZ$_{21}$ | 6.3 EtZ$_{11}$ | 10:90 | 3 dp. Butox | 20′ | 30′ | 275° | 275° | 0.21 | 189° |

This product was similar to that described in Examples 16 and 18.

| 20 | 8.1 EtZ$_{21}$ | 0.96 EtZ$_{22}$ | 90:10 | 3 dp. Butox | 20′ | 30′ | 275° | 275° | 0.23 | 209° |

The polymer obtained was a crystalline, white mass. Threads were formed which quenched in air, were cold drawn and heat set to form valuable fibers.

| 21 | 810 EtZ$_{21}$ | 96 EtZ$_{22}$ | 90:10 | 2 g. Butox | 40′ | 70′ | 245° | 260° | 0.65 | 210° |

See footnotes at end of tables.

In this example the reaction was conducted with continuous stirring. The product was essentially the same as in the preceding example except for a higher intrinsic viscosity. This melt was extruded as a film of 0.05 inch thickness which satisfactorily quenched in water to form an amorphous product. This film was then drawn in perpendicular directions along the plane of its surface so as to form an oriented structure which was heat set to produce a film or sheet having excellent properties suitable for use as a wrapping material, photographic film, etc. Useful fibers were similarly prepared.

| Example No. | Grams and Symbol of Primary Monomer | Grams and Symbol of Copolymer Monomer | Mol Ratio | Amount and Symbol for Catalyst | Minutes for— | | Temp. (°C.) for— | | Intrinsic Viscosity | Melting Point, °C. |
|---|---|---|---|---|---|---|---|---|---|---|
| | | | | | I Stage | II Stage | I Stage | II Stage | | |
| 22 | 7.2 $EtZ_{21}$ | 1.5 $EtZ_{22}$ | 80:20 | 3 dp. Butox | 20′ | 30′ | 275° | 275° | [1] Low | 220° |

This polymer was similar to that described in Examples 20 and 21.

| 23 | 7.2 $MeZ_{21}$ | 1.5 $MeZ_{22}$ | 80:20 | 4 dp. Ethox | 25′ | 45′ | 250° | 265° | 0.51 | 220° |

This polymer was similar to that described in Examples 20–22.

| 24 | 6.3 $EtZ_{21}$ | 2.9 $EtZ_{22}$ | 70:30 | 3 dp. Butox | 20′ | 30′ | 275° | 275° | [1] Low | 231° |

This polymer was similar to that described in Examples 20–23.

| 25 | 4.5 $EtZ_{21}$ | 4.8 $EtZ_{22}$ | 50:50 | 3 dp. Butox | 20′ | 30′ | 275° | 275° | [1] Low | 236° |

This polymer was similar to that described in Example 24.

| 26 | 1.8 $EtZ_{21}$ | 7.7 $EtZ_{22}$ | 20:80 | 3 dp. Butox | 20′ | 30′ | 275° | 275° | [1] Low | 229° |

This polymer was similar to that described in Example 25 but was more viscous at 275° C.

| 27 | 0.9 $EtZ_{21}$ | 8.6 $EtZ_{22}$ | 10:90 | 3 dp. Butox | 20′ | 30′ | 275° | 275° | 0.33 | 238° |

This polymer was similar to that described in Example 26.

| 28 | 0.45 $EtZ_{21}$ | 9.1 $EtZ_{22}$ | 5:95 | 3 dp. Butox | 25′ | 40′ | 260° | 275° | 0.41 | 245° |

This polymer was similar to that described in Example 26 but crystallized more rapidly.

| 29 | 8.55 $EtZ_{21}$ | 0.5 $EtZ_{202}$ | 95:5 | 3 dp. Butox | 30′ | 40′ | 265° | 275° | 0.37 | 247° |

The melt produced cooled to form a white crystalline polymer. Fibers were produced from the melt which were mechanically worked and heat set. These fibers could not be quenched as easily as those in the following example.

| 30 | 8.1 $EtZ_{21}$ | 1.0 $EtZ_{202}$ | 90:10 | 3 dp. Ethox | 30′ | 50′ | 265° | 275° | 0.29 | 240° |

This melt obtained crystallized slowly to form a tough white polymer. Fibers drawn from the melt were quenched satisfactorily, cold drawn and heat set to form useful fibers for making yarn, fabric, etc.

| 31 | 8.15 $BuZ_{21}$ | 1.0 $BuZ_{202}$ | 90:10 | 3 dp. Butox | 35′ | 45′ | 240° | 260° | 0.44 | 241° |

See footnotes at end of tables.

This polymer was similar to that described in Example 30.

| Example No. | Grams and Symbol of Primary Monomer | Grams and Symbol of Copolymer Monomer | Mol Ratio | Amount and Symbol for Catalyst | Minutes for— | | Temp. (°C.) for— | | Intrinsic Viscosity | Melting Point, °C. |
|---|---|---|---|---|---|---|---|---|---|---|
| | | | | | I Stage | II Stage | I Stage | II Stage | | |
| 32 | 8.25 $TyZ_{21}$ | 1.0 $TyZ_{202}$ | 90:10 | 0.01 g. of Dioxane-complex. | 35′ | 45′ | 260° | 275° | 0.37 | 240° |

This polymer was similar to that described in Example 30.

| 33 | 8.2 $PhZ_{21}$ | 1.0 $PhZ_{202}$ | 90:10 | 0.01 g. of Et-complex. | 35′ | 45′ | 260° | 275° | 0.41 | 240° |

This polymer was similar to that described in Example 30.

| 34 | 8.1 $EtZ_{21}$ | 1.0 $EtZ_{202}$ | 90:10 | 3 dp. Butox | 20′ | 30′ | 275° | 275° | 0.29 | 241° |

This polymer was similar to that described in Example 30.

| 35 | 810 $EtZ_{21}$ | 100 $EtZ_{202}$ | 90:10 | 2 g. Butox | 40′ | 75′ | 245° | 265° | 0.61 | 242° |

In this example the reaction was conducted with continuous stirring. The product was essentially the same as in the preceding example except for a higher intrinsic viscosity. The melt was extruded as a film of 0.05 inch thickness which satisfactorily quenched in water to form an amorphous product. This film was then drawn in perpendicular directions along the plane of its surface so as to form an oriented structure which was heat set to produce a film or sheet having excellent properties suitable for use as a wrapping material, photographic film, etc. Useful fibers were similarly prepared.

| 36 | 7.2 $EtZ_{21}$ | 2.1 $EtZ_{202}$ | 80:20 | 3 dp. Butox | 20′ | 30′ | 275° | 275° | [1] Low | 180° |

This polymer was similar to that described in Example 30. Fibers drawn from the melt air quenched satisfactorily but did not cold draw as readily.

| 37 | 6.3 $EtZ_{21}$ | 3.1 $EtZ_{202}$ | 70:30 | 3 dp. Butox | 20′ | 30′ | 275° | 275° | [1] Low | 162° |

This polymer was similar to that described in Example 36. The cooled melt was somewhat brittle.

| 38 | 4.5 $EtZ_{21}$ | 5.2 $EtZ_{202}$ | 50:50 | 3 dp. Butox | 20′ | 30′ | 275° | 275° | [1] | [2] |

This polymer was similar to that described in Example 37. It crystallized with difficulty and was rather brittle. More advantageous properties can be developed by modification of the polymerization conditions.

| 39 | 1.8 $EtZ_{21}$ | 8.4 $EtZ_{202}$ | 20:80 | 3 dp. Butox | 20′ | 30′ | 275° | 275° | [1] | [2] |

This polymer was similar to that described in Example 38.

| 40 | 0.9 $EtZ_{21}$ | 9.4 $EtZ_{202}$ | 10:90 | 3 dp. Butox | 20′ | 30′ | 275° | 275° | [1] | [2] |

This polymer was similar to that described in Example 38.

| 41 | 0.45 $EtZ_{21}$ | 9.9 $EtZ_{202}$ | 5:95 | 3 dp. Ethox | 30′ | 45′ | 260° | 275° | [1] | [2] |

[1] Intrinsic viscosities in some instances were not determined or were found to be about 0.20 or somewhat less; in the latter instances the viscosity could be increased by obvious revision of the condensation conditions, especially as regards stirring.
[2] Melting points were not determined for all examples.

This polymer was similar to that described in Example 38 except that it crystallized fairly rapidly. Useful fibers were formed from the melt. These fibers were satisfactorily quenched, cold drawn and heat set.

The interpolycarbonates of this invention can be prepared employing other catalysts, other primary bis-(carbonate) monomers, other copolymerizable bis-(carbonate) monomers and other reaction conditions in a manner analogous to that described in the preceding examples within the scope of the description of this invention set forth hereinbefore.

The photographic films which can be produced according to this invention advantageously comprise a film support prepared from one of the above-described interpolycarbonates upon which is deposited one or more layers of a silver halide emulsion which can contain appropriate sensitizers or other additives to suit the intended photographic use.

We claim:

1. A process for preparing an interpolycarbonate which comprises (A) co-condensing a mixture consisting of at least 5 mole percent of a primary bis-(carbonate) monomer having the following formula:

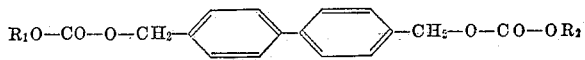

wherein $R_1$ and $R_2$ each represents a radical selected from the group consisting of lower alkyl radicals containing from 1 to 4 carbon atoms and aryl radicals of the benzene series containing from 6 to 8 carbon atoms, together with at least 5 mole percent of a copolymerizable bis-(carbonate) monomer selected from the group consisting of those having the following formulas:

| Chemical Formula | Designation |
|---|---|
| $R_1O-CO-O-R_3-O-CO-OR_2$ | (a) |
| $R_1O-CO-O-(CH_2)_2-O-\langle\rangle-O-(CH_2)_2-O-CO-OR_2$ | (b) |
| $R_1O-CO-O-CH_2-\langle\rangle-CH_2-O-CO-OR_2$ | (c) |
| $R_1O-CO-O-(CH_2)_2-\langle\rangle-\langle\rangle-(CH_2)_2-O-CO-OR_2$ | (d) |
| $R_1O-CO-O-(CH_2)_2-O-\langle\rangle-\langle\rangle-O-(CH_2)_2-O-CO-OR_2$ | (e) | wherein $R_1$ and $R_2$ each represents a radical selected from the group consisting of lower alkyl radicals containing from 1 to 4 carbon atoms and aryl radicals of the benzene series containing from 6 to 8 carbon atoms and $R_3$ represents an alkylene radical containing from 4 to 10 carbon atoms, (a) and (b) being used in amounts up to 50 mole percent, and (c), (d) and (e) being used in amounts up to 95 mole percent, (B) in the presence of an ester-interchange catalyst containing titanium as the metallic element, which catalyst is selected from the group consisting of $Ti(OR')_4$, and ether complexes of $TiX_4$ wherein the ether complexes are derived by reacting $TiX_4$ with an ether selected from the group consisting of aliphatic and alicyclic ethers containing from 2 to 12 carbon atoms, and wherein R' represents an alkyl radical containing from 1 to 18 carbon atoms and X represents a halogen atom, (C) at an elevated temperature, (D) the condensation being conducted in an inert atmosphere and (E) the latter part of the condensation being conducted at a very low pressure.

2. A process as defined in claim 1 wherein the elevated temperature during the course of the condensation is in excess of about 225° C.

3. A process as defined in claim 2 wherein the ester-interchange catalyst is employed in an amount of from about 0.005% to about 0.5% based on the weight of the mixture of bis(carbonate) monomers.

4. A process as defined in claim 3 wherein the low pressure is less than about 1 mm. of Hg pressure.

5. A process as defined in claim 4 wherein the primary bis(carbonate) monomer is 4,4'-bis(β-hydroxymethyl)-biphenyl-bis-(ethyl carbonate).

6. A process as defined in claim 5 wherein the copolymerizable bis-(carbonate) monomer is 1,6-hexanediol-bis-(ethyl carbonate).

7. A process as defined in claim 5 wherein the copolymerizable bis-(carbonate) monomer is 1,4-bis(β-hydroxyethoxy)-benzene-bis-(ethyl carbonate).

8. A process as defined in claim 5 wherein the copolymerizable bis-(carbonate) monomer is 1,4-bis(hydroxymethyl)-benzene-bis-(ethyl carbonate).

9. A process as defined in claim 5 wherein the copolymerizable bis-(carbonate) monomer is 4,4'-bis(β-hydroxyethyl)-biphenyl-bis(ethyl carbonate).

10. A process as defined in claim 5 wherein the copolymerizable bis-(carbonate) monomer is 4,4'-bis(β-hydroxy-ethoxy)-biphenyl-bis(ethyl carbonate).

11. Linear highly polymeric crystalline interpolycarbonates containing at least 5 mole percent of the following repeating units:

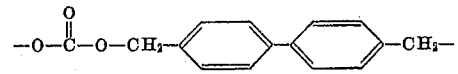

wherein the units are interspersed with at least 5 mole percent of a copolymerized unit selected from the group consisting of those having the following formulas:

| Chemical Formula | Designation |
|---|---|
| 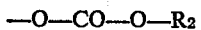 | (a) |
| —O—C(=O)—O—(CH₂)₂—O—⟨benzene⟩—O—(CH₂)₂— | (b) |
| —O—C(=O)—O—CH₂—⟨benzene⟩—CH₂— | (c) |
| 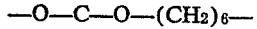 | (d) |
| 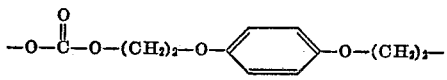 | (e) | wherein $R_3$ represents an alkylene radical containing from 4 to 10 carbon atoms, (a) and (b) being present in amounts up to 50 mole percent, and (c), (d) and (e) being present in amounts up to 95 mole percent, and one end of each polymer molecule contains an $R_1$— radical attached to the terminal free oxygen bond and the other end of each polymer molecule contains an $$—O—CO—O—R_2$$

radical attached to the terminal free methylene bond, wherein $R_1$ and $R_2$ each represents a radical selected from the group consisting of lower alkyl radicals containing from 1 to 4 carbon atoms and aryl radicals of the benzene series containing from 6 to 8 carbon atoms.

12. An interpolycarbonate as defined in claim 11 wherein the copolymerized unit is present to the extent of from about 10 to 30% and has the formula:

$$—O—C—O—(CH_2)_6—$$

13. An interpolycarbonate as defined in claim 11 wherein the copolymerized unit is present to the extent of from about 10 to 30% and has the formula:

—O—C(=O)—O—(CH₂)₂—O—⟨benzene⟩—O—(CH₂)₂—

14. An interpolycarbonate as defined in claim 11 wherein the copolymerizable unit is present to the extent of from about 10 to about 90% and has the formula:

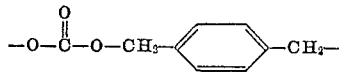

15. An interpolycarbonate as defined in claim 11 wherein the copolymerizable unit is present to the extent of from about 10 to about 90% and has the formula:

16. An interpolycarbonate as defined in claim 11 wherein the copolymerizable unit is present to the extent of from about 10 to about 90% and has the formula:

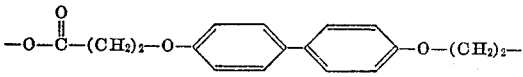

17. Fiber composed essentially of an interpolycarbonate as defined in claim 11.

18. Film composed essentially of an interpolycarbonate as defined in claim 11.

References Cited in the file of this patent
UNITED STATES PATENTS
2,210,817    Peterson _____ Aug. 6, 1940